(12) United States Patent
Messano

(10) Patent No.: US 6,425,625 B1
(45) Date of Patent: *Jul. 30, 2002

(54) ROOFTOP DECK SYSTEMS FOR VEHICLES

(76) Inventor: Frank Messano, 2100 Heyneman La., Simi Valley, CA (US) 93065

( * ) Notice: Subject to any disclaimer, the term of this patent is extended or adjusted under 35 U.S.C. 154(b) by 0 days.

This patent is subject to a terminal disclaimer.

(21) Appl. No.: 09/766,996

(22) Filed: Jan. 23, 2001

Related U.S. Application Data

(63) Continuation-in-part of application No. 09/491,764, filed on Jan. 27, 2000, which is a continuation-in-part of application No. 08/929,691, filed on Sep. 15, 1997, now abandoned.

(51) Int. Cl.$^7$ .................................................. B60P 3/32
(52) U.S. Cl. ........................ 296/156; 296/164; 296/210
(58) Field of Search .......................... 296/26.04, 26.06, 296/26.07, 156, 164, 165, 210; 114/363

(56) References Cited

U.S. PATENT DOCUMENTS

| | | | |
|---|---|---|---|
| 1,034,278 A | 7/1912 | Munsen | |
| 3,161,246 A | 12/1964 | Meeker | |
| 3,193,851 A | 7/1965 | Fieblkorn | |
| 3,719,383 A | * 3/1973 | Ferro | .................. 296/26.04 X |
| 3,860,982 A | 1/1975 | Rumsey | |
| 3,941,074 A | 3/1976 | Millerbernd | |
| 3,960,102 A | 6/1976 | Davy | |
| 3,981,259 A | 9/1976 | Harper, Jr. | |
| 4,494,937 A | 1/1985 | Riermann | |
| 4,716,850 A | 1/1988 | Lachance | |
| 4,837,914 A | * 6/1989 | Borum et al. | ........... 296/210 X |
| 5,243,924 A | 9/1993 | Mann | |
| 5,617,805 A | 4/1997 | Frigard | |
| 6,159,058 A | 12/2000 | Matheson | |
| 6,237,988 B1 | * 5/2001 | Messano | .............. 296/26.06 X |

FOREIGN PATENT DOCUMENTS

| | | | |
|---|---|---|---|
| GB | 2158295 | * 6/1986 | ................. 296/210 |
| JP | 404103432 | * 4/1992 | ................. 296/165 |

* cited by examiner

*Primary Examiner*—Dennis H. Pedder

(57) ABSTRACT

A one-piece monocoque vehicle rooftop deck system for the top of a vehicle that includes furniture and safety handrails.

15 Claims, 6 Drawing Sheets

FIG. 3
FIG. 4
FIG. 5
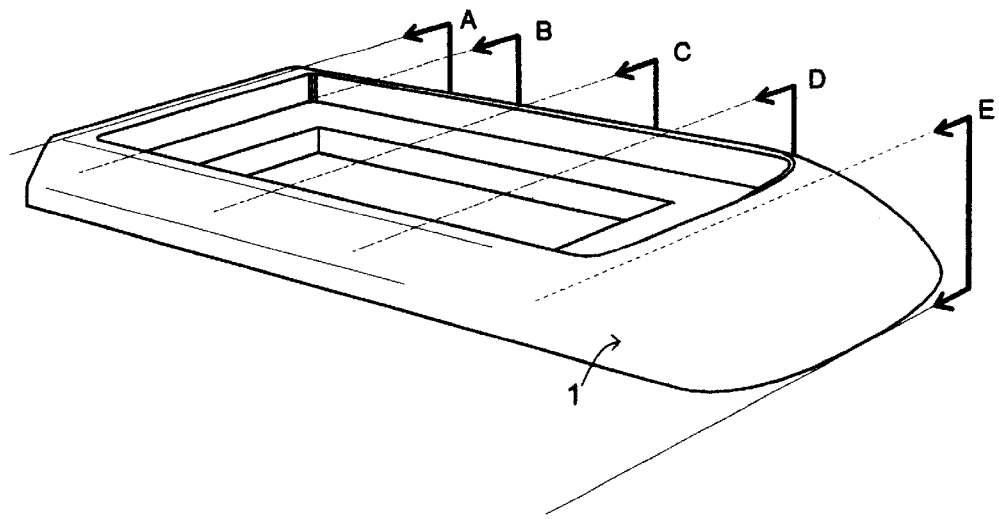
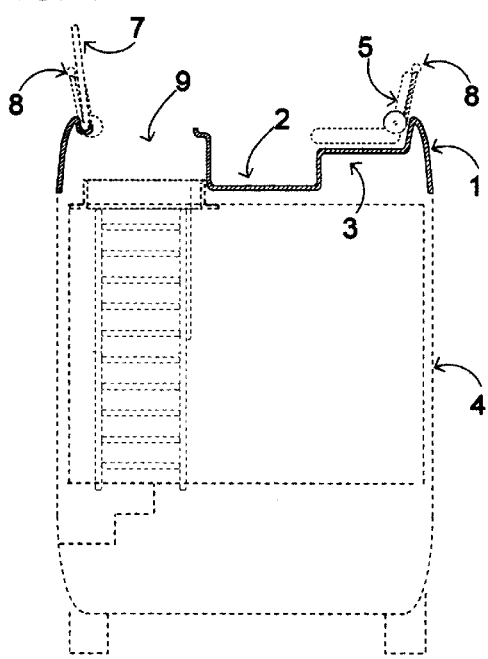
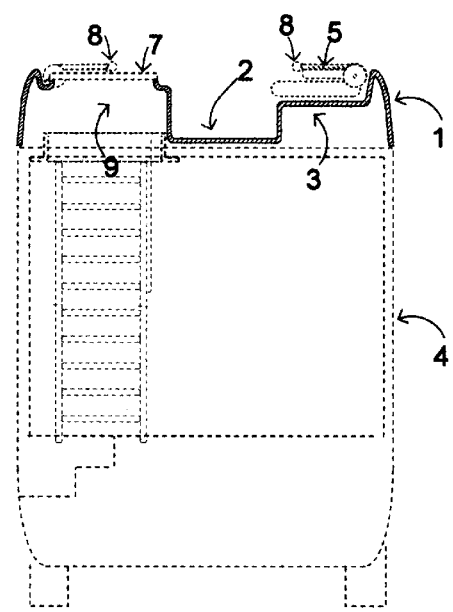

ROOFTOP DECK SYSTEMS FOR VEHICLES

CROSS-REFERENCE TO RELATED APPLICATIONS

This application is a continuation-in-part of Ser. No. 09/491,764, filed Jan. 27, 2000, which is a continuation-in-part of Ser. No. 08/929,691, filed Sep. 15, 1997, abandoned.

This invention relates to my previous Patent US 6,237,988—STREAMLINE ROOFTOP DECK FOR MOTORHOMES, and this is an enhancement of the invention with a one-piece rooftop deck system.

BACKGROUND OF THE INVENTION

1. Field of the Invention

This invention relates generally to permanently mounted streamline folding rooftop deck assemblies and expanding flotation bottoms for vehicles as described in Patent US 6,237,988—STREAMLINE ROOFTOP DECK FOR MOTORHOMES which claims . . .

A vehicle rooftop deck system comprising:

a plurality of streamline cowlings enclosing the perimeter of a vehicle rooftop;

a plurality of rooftop safety handrails which fold down to a low profile for travel, which fold upward for use, which enclose the perimeter of the rooftop when in the upward position, and which affix to the rooftop;

folding rooftop furniture, backs of which support the safety handrails, and which backs fold down to a low profile for travel and which backs fold upward for use, and furniture understructure which affixes the furniture to the rooftop and which affixes the streamline cowlings to the vehicle rooftop.

This invention is a rooftop assembly incorporating the streamline cowlings and furnishings structures of Patent Application 09/491,764 into a one-piece molded unit to simplify the manufacturing process.

2. Description of Related Art

It is known in the art to attach decks and cabins to the tops of mobile homes, campers, housecars, and other recreational land vehicles. See, for example, U.S. Pat. No. 6,237,988 (Messano), U.S. Pat. No. 3,719,383 (Ferro 1973), U.S. Pat. No. 4,837,914 (Borum 1989), and UK Patent Application GB2168295A (Christos 1984).

While U.S. Pat. No. 3,719,383 (ferro 1973) claims a one-piece removably camper unit, it is not claimed nor intended to be a vehicle rooftop entertainment deck. Similarly, U.S. Pat. No. 4,837,914 (Borum 1989) claims a one-piece molded conversion roof for a vehicular van to increase interior headroom space, it is not claimed nor intended to be a vehicle rooftop entertainment deck. And while UK Patent Application GB2168295A (Christos 1984) claims a demountable upper deck with an upstanding circumambient wall for temporary use upon a vehicle, it specifically excludes upper decks affixed to vehicles.

And while U.S. Pat. No. 6,237,988 (Messano) discloses a "plurality" of streamline cowlings enclosing the perimeter of a vehicle rooftop, the inclusion of a one-piece cowling is an improvement to the invention.

SUMMARY OF THE INVENTION

The present invention is a vehicle rooftop deck system enhancement to my previous U.S. Pat. No. 6,237,988 (Messano)—STREAMLINE ROOFTOP DECK FOR MOTORHOMES.

BRIEF DESCRIPTION OF THE DRAWINGS

Other features and advantages of the present invention will be apparent from the following detailed descriptions of preferred embodiments thereof when read in conjunction with reference to the accompanying drawings, wherein:

FIG. 3 is a perspective view of the one-piece assembly of FIG. 1 showing location of drawing cross-sections A through E.

FIG. 4 is a cross-section at C of the one-piece assembly shown in FIG. 1, depicting an embodiment of an integral hatchway, rooftop deck, and side seat structure (in solid line) relating to the Open hatch lid and UP position of the folding seat back and folding safety handrail units of U.S. Pat. No. 6,237,988 (Messano) (broken line) and relating to a typical motorhome cross-section (in broken line).

FIG. 5 is the same cross-section at C of the one-piece assembly shown in FIG. 1, depicting an embodiment of an integral hatchway, rooftop deck, and side seat structure (in solid line) relating to the Closed hatch lid and Down position of the folding seat back and folding safety handrail units of U.S. Pat. No. 6,237,988 (Messano) shown in broken line.

DETAILED DESCRIPTION OF THE PREFERRED EMBODIMENTS

In my previous U.S. Pat. No. 6,237,988 (Messano)—STREAMLINE ROOFTOP DECK FOR MOTORHOMES, one of the claims is "A vehicle rooftop deck system comprising: a plurality of streamline cowlings enclosing the perimeter of a vehicle rooftop". The U.S. Pat. No. 6,237,988 (Messano) drawings depict the cowlings as an assembly of four components (a front streamline cowling, center section streamline cowlings—one on each side of the motorhome, and a rear streamline cowling), while the Detailed Description of the Preferred Embodiments for FIG. 2 U.S. Pat. No. 6,237,988 (Messano) states the cowlings can consist of "any number of elements, including a one-piece streamline cowling". As my claim in that Patent is for a "plurality of streamline cowlings", this new invention for this application is, in part, a claim for a one-piece cowling enclosing the perimeter of the vehicle rooftop. In all other respects, this one-piece cowling serves the same utility of the plurality of cowlings as the streamline cowlings claimed in U.S. Pat. No. 6,237,988 (Messano).

In this invention, the drawings for the one-piece cowling depict typical arrangements of furniture, rooftops & decks within the assembly to illustrate their application. The one-piece assembly can be fabricated as a single unit (as for example in one large molded part) or may comprise any number of sub-assemblies to form a single one-piece assembly (as for example in a monocoque plastic or metal structure). The number of furniture elements within the one-piece assembly, their arrangement, and their proportions vary with each application on each vehicle. The number and kind of furniture elements depicted, their lengths and widths, and their locations vary depending upon the physical conditions of the vehicle to which they are affixed. The preferred embodiments are not limiting, but illustrate typical types of applications.

Figure 1:
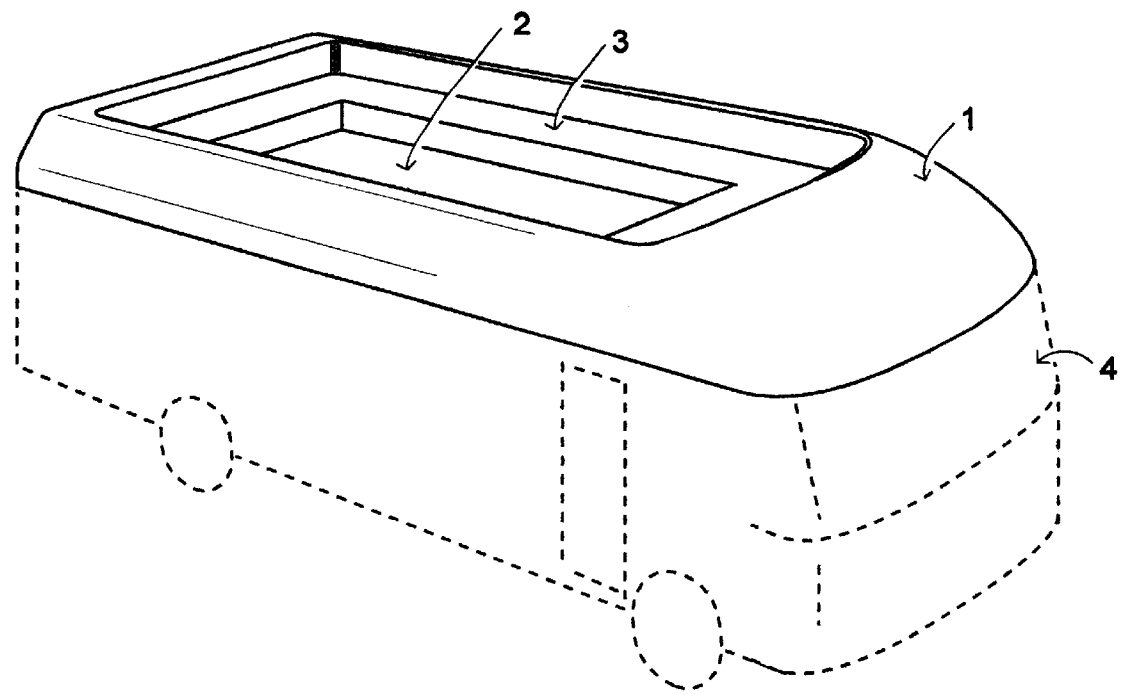
FIG. 1 is a perspective view of one embodiment of the invention depicting representative cowlings and rooftop furniture understructure as a one-piece assembly on a typical motorhome rooftop (motorhome-shown in broken lines).

With reference to FIG. 1, a perspective view of a one-piece rooftop cowling for vehicles 1, the first embodiment of the present invention shown comprising a center deck section 2, and seating 3, all permanently affixed to a typical motorhome (shown in broken line) 4, with these elements fabricated by any suitable process from a plurality of aesthetically pleasing materials that are suitable for installation on a vehicle, e.g., metals, plastics, composites, fabrics, moldings, castings. The number and types of elements shown depict a typical one-piece assembly, whereas specific assemblies omit, add, or modify elements as suitable for application to the intended vehicle.

Figure 2:
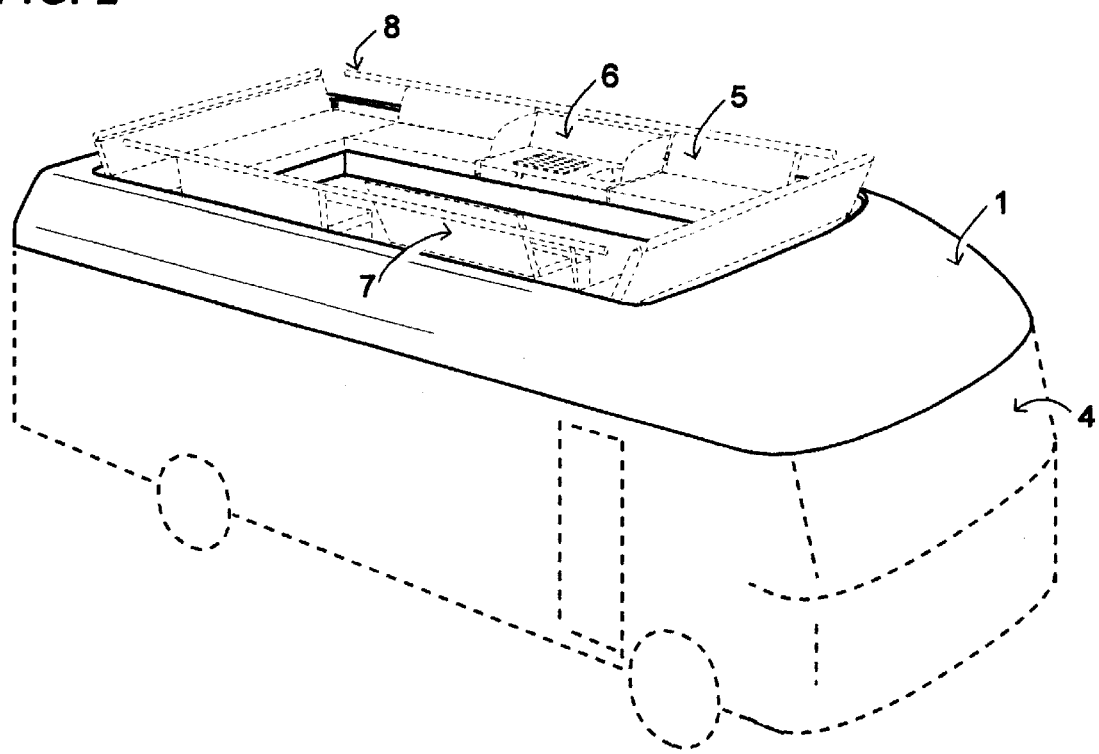
FIG. 2 is a perspective view of the same one-piece assembly of FIG. 1 (in sold line) depicting the relationship of representative folding rooftop furnishings, folding safety handrails, stair hatchway, barbecue console, and seamless rooftop deck elements of U.S. Pat. No. 6,237,988 (Messano)—STREAMLINE ROOFTOP DECK FOR MOTORHOMES (shown in broken line).

FIG. 2 perspective illustrates an embodiment of the invention one-piece cowling 1 assembled upon a typical motorhome 4, showing fold upward seat backs 5, barbecue 6, hatchway lid (open position) 7, and safety handrails 8 from U.S. Pat. No. 6,237,988 (Messano) in the UP position (broken line).

FIG. 3 perspective illustrates an embodiment of the invention one-piece cowling 1, showing cross-section areas A, B, C, D,and E.

FIG. 4 is cross-section C of the one-piece cowling 1 depicting an embodiment of an integral hatchway 9, deck 2, and inside seat structure 3 (in solid line), relating to the hatchway lid (open position) 7, the folding seat back 5 and folding safety handrail units 8 of U.S. Pat. No. 6,237,988 (Messano) (broken line) and relating to a typical vehicle cross-section 4 (broken line).

FIG. 5 is the same cross-section at C of the one-piece cowling 1 shown in FIG. 4, depicting the hatchway lid (closed position) 7, the folding seat back 5 and folding safety handrail units 8 of U.S. Pat. No. 6,237,988 (Messano) (broken line) and relating to a typical vehicle cross-section 4 (broken line).

Figure 6:
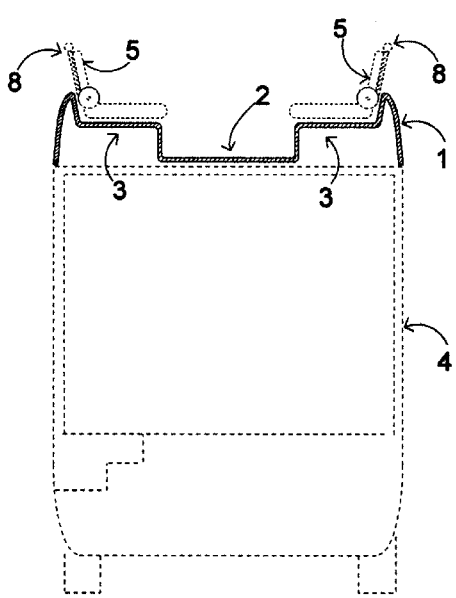
FIG. 6 is a cross-section at B of the one-piece assembly shown in FIG. 1, depicting an embodiment of an integral seat structure-rooftop/deck-seat structure (in solid line) relating to the UP position of the folding seat backs and folding safety handrail units of U.S. Pat. No. 6,237,988 (Messano) shown in broken line.

FIG. 6 is a cross-section at B of the one-piece cowling 1 shown in FIG. 1, depicting an integral seat structure 3—rooftop/deck 2—seat structure 3 (in solid line) relating to the UP position of the folding seat back 5 and folding safety handrail units 8 of U.S. Pat. No. 6,237,988 (Messano) (broken line) and relating to a typical vehicle cross-section 4 (broken line).

Figure 7:
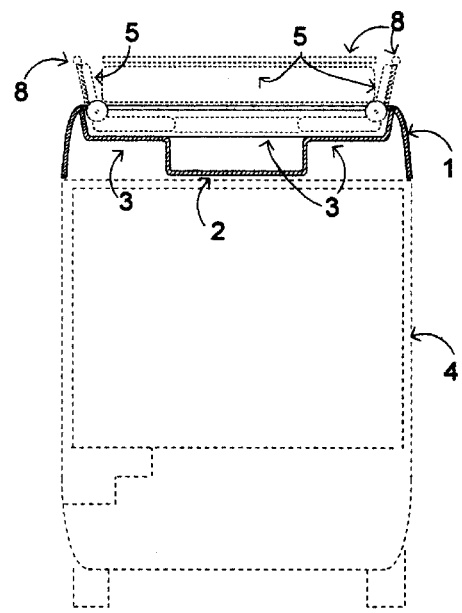
FIG. 7 is a cross-section at A of the one-piece assembly shown in FIG. 1, depicting an embodiment of an integral rear U shaped seat structure and rooftop/deck near the rear of the assembly (in solid line) relating to the UP position of the folding seat backs and folding safety handrail units of U.S. Pat. No. 6,237,988 (Messano) shown in broken line.

FIG. 7 is a cross-section at A of the one-piece cowling 1 shown in FIG. 1, depicting an integral rear U shaped seat structure 3 and rooftop/deck 2 near the rear of the assembly (in solid line) relating to the UP position of the folding seat backs 5 and folding safety handrail units 8 of U.S. Pat. No. 6,237,988 (Messano) (broken line) and relating to a typical vehicle crosssection 4 (broken line).

Figure 8:
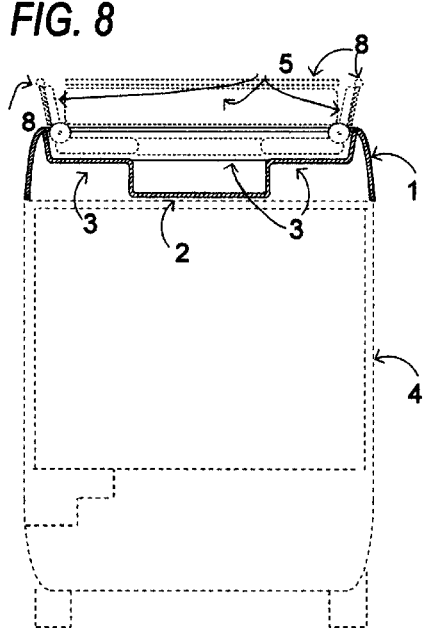
FIG. 8 is a cross-section at D of the one-piece assembly shown in FIG. 1, depicting an embodiment of an integral front U shaped seat structure and rooftop/deck near the front of the assembly (in solid line) relating to the UP position of the folding seat backs and folding safety handrail units of U.S. Pat. No. 6,237,988 (Messano) shown in broken line.

FIG. 8 is a cross-section at D of the one-piece cowling 1 shown in FIG. 1, depicting an embodiment of an integral front U shaped seat structure 3 and rooftop deck near 2 the front of the assembly (in solid line) relating to the UP position of the folding seat backs 5 and folding safety handrail units 8 of U.S. Pat. No. 6,237,988 (Messano) (broken line) and relating to a typical vehicle cross-section 4 (broken line).

Figure 9:
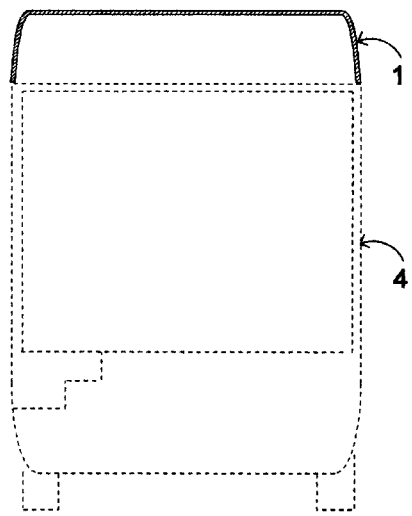
FIG. 9 is a cross-section at E of the one-piece assembly shown in FIG. 1, depicting an embodiment of the cowling near the front of the assembly (in solid line), and relating to a typical vehicle cross-section (in broken line).

FIG. 9 is a cross-section at E of the one-piece cowling 1 shown in FIG. 1, depicting an embodiment of the cowling near the front of the assembly (in solid line), and relating to a typical vehicle cross-section 4 (broken line).

Figure 10:
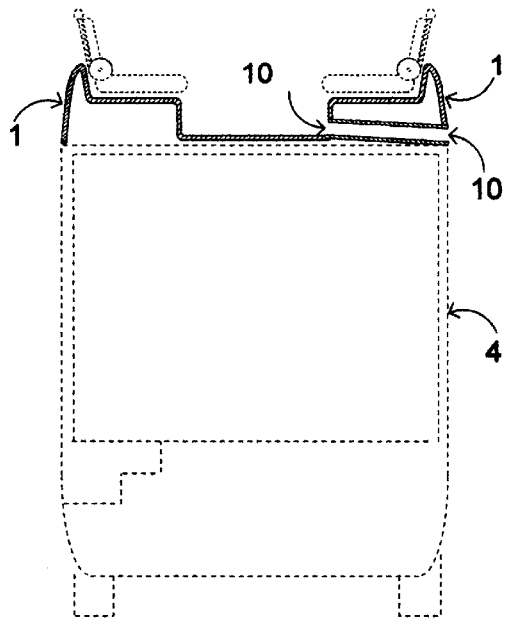
FIG. 10 is a cross-section at B of the one-piece assembly shown in FIG. 1, depicting an embodiment of an integral molded seat structure-rooftop/deck-seat structure showing a typical deck drain to the outside of the vehicle (in solid line).

FIG. 10 is a cross-section at B of the one-piece cowling 1 shown in FIG. 1, showing the embodiment of an integral seat structure-rooftop/deck-seat structure of FIG. 6. depicting a typical deck drain 10 to the outside of the vehicle (in solid line) and relating to a typical vehicle cross-section 4 (broken line).

Figure 11:
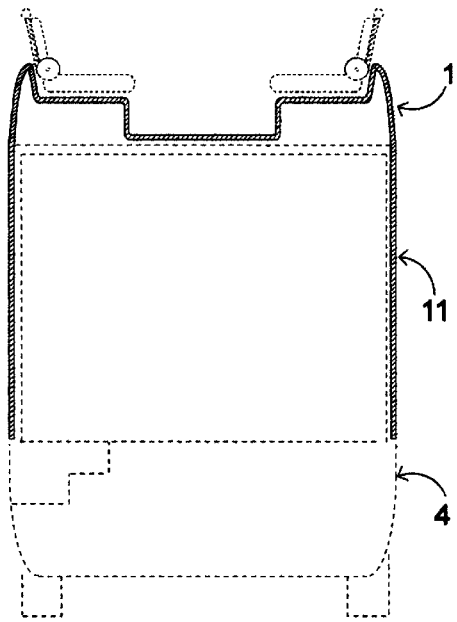
FIG. 11 is a typical cross-section of the one-piece assembly shown in FIG. 1, depicting an embodiment with integral side surfaces of a typical vehicle (in solid line) relating to a typical vehicle cross-section (in broken line).

FIG. 11 is a typical cross-section of the one-piece cowling 1 shown in FIG. 1, depicting an embodiment with integral side surfaces 11 of a typical vehicle (in solid line) relating to a typical vehicle cross-section 4 (broken line). In this embodiment, the cowling 1 extends downward a distance to form part or all of the sides of the vehicle.

Figure 12:
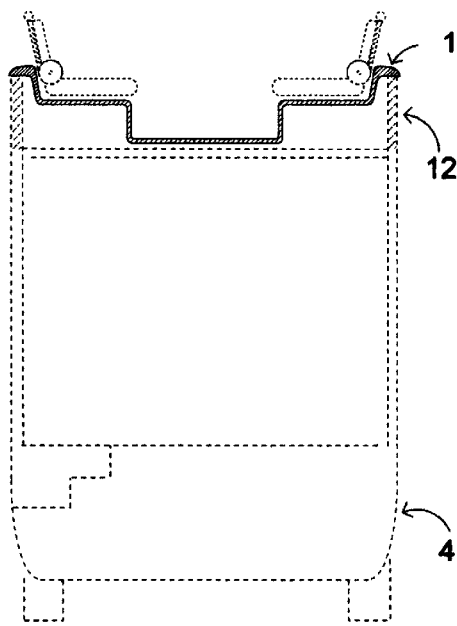
FIG. 12 is a typical cross-section of the one-piece assembly shown in FIG. 1, depicting an embodiment with minimized cowlings (in solid line) relating to a typical vehicle cross-section showing the vehicle sides extending above the roof to form part of the cowlings (in broken line).

FIG. 12 is a typical cross-section of the one-piece cowling 1 shown in FIG. 1, depicting an embodiment with minimized sides on the cowlings (in solid line) and where the sides of a vehicle extend upward beyond the roof line 12 to join the cowling's interior elements.

Figure 13:
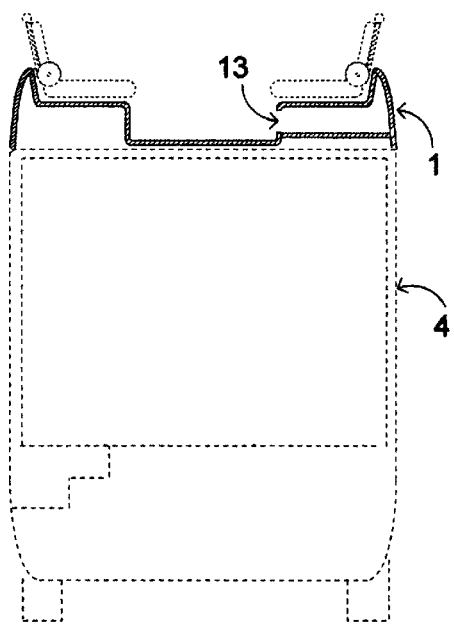
FIG. 13 is a typical cross-section of the one-piece assembly shown in FIG. 1, depicting an embodiment of an integral storage compartment within the furnishings structure (in solid line).

FIG. 13 is a typical cross-section of the one-piece cowling 1 shown in FIG. 1, depicting an embodiment of an integral storage compartment 13 within the furnishings structure (in solid line). The storage compartments occupy the empty area between the vehicle roof and the bottom of the seating units. Their number and arrangement vary according to the application on specific vehicles.

Figure 14:
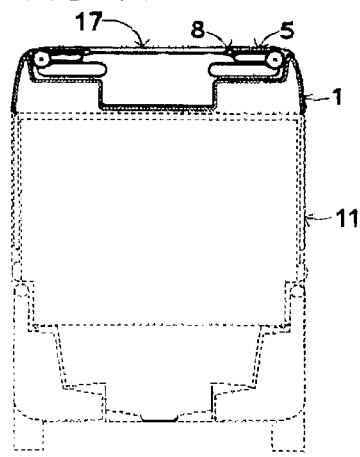
FIG. 14 is a typical cross-section of the one-piece assembly shown in FIG. 2 with safety handrails and seats U.S. Pat. No. 6,237,988 (Messano) in the Down position (in solid line), depicting an embodiment with an amphibious vehicle (in broken line) in the Closed Land Use configuration.

FIG. 14 is a typical cross-section of the rooftop deck system 1 shown in FIG. 2 with safety handrails 8 and seats 5 from U.S. Pat. No. 6,237,988 (Messano) in the Down position (in solid line), depicting an embodiment with an amphibious vehicle 11 (in broken line).

Figure 15:
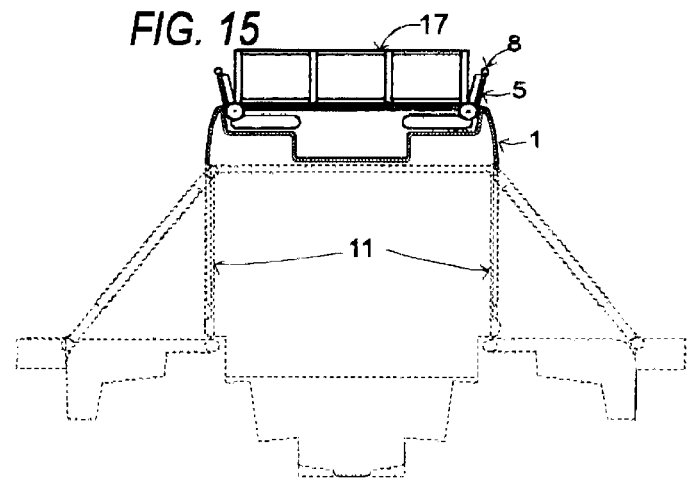
FIG. 15 is the same cross-section as FIG. 14 showing the one-piece assembly of FIG. 2 with the safety handrails and seats from U.S. Pat. No. 6,237,988 (Messano) in the UP position (in solid line), and showing the amphibious vehicle in the Open Water Use configuration (in broken line).

FIG. 15 is a typical cross-section of the rooftop deck system 1 shown in FIG. 2 with safety handrails 8 and seats 5 from U.S. Pat. No. 6,237,988 (Messano) and with the cowling windshield 17 in the Up position (in solid line), depicting the amphibious vehicle 11 (in broken line).

Figure 16:
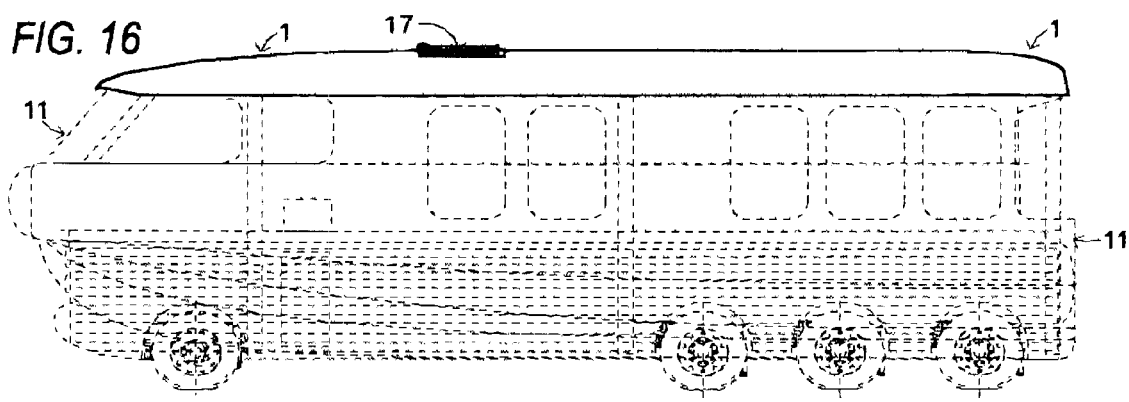
FIG. 16 is a typical side view of the one-piece assembly shown in FIG. 14 cross-section with safety handrails and seats from U.S. Pat. No. 6,237,988 (Messano) in the Down position (in solid line), depicting the amphibious vehicle in the Closed Land Use configuration (in broken line).

FIG. 16 is a typical side view of the rooftop deck system shown in FIG. 14 cross-section showing the cowling 1 with safety handrails 8 and seats 5 from U.S. Pat. No. 6,237,988 (Messano), and the cowling windshield 17 in the Down position (in solid line), depicting the amphibious vehicle 11 in the Closed Land Use configuration.

Figure 17:
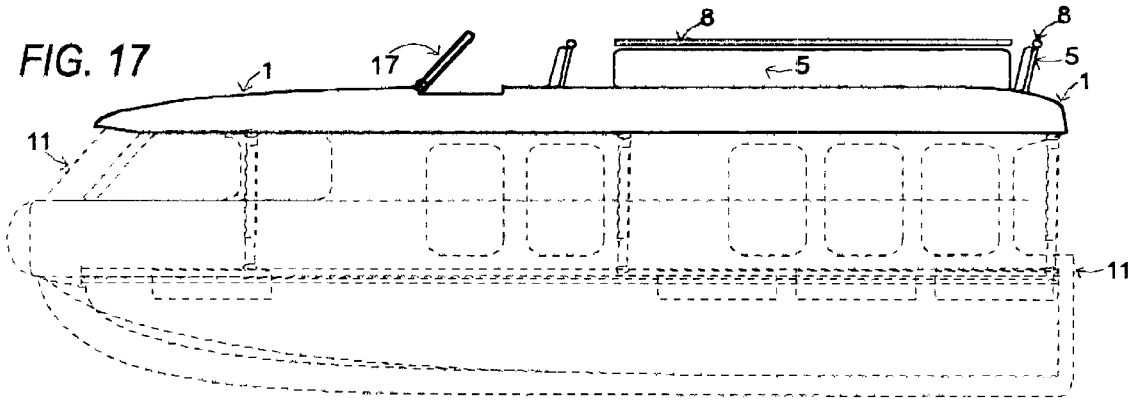
FIG. 17 is a typical side view of the one-piece assembly shown in FIG.15 cross-section with the safety handrails and seats from U.S. Pat. No. 6,237,988 (Messano) in the UP position (solid line), and showing the amphibious vehicle in the Open Water Use configuration (broken line).

FIG. 17 is a typical side view of the rooftop deck system shown in FIG. 15 cross-section showing the cowling 1 with the safety handrails 8 and seats 5 from U.S. Pat. No. 6,237,988 (Messano) and cowling windshield 17 in the UP position (solid line) embodiment on the amphibious vehicle in the Open Water Use configuration (in broken line).

Figure 18:
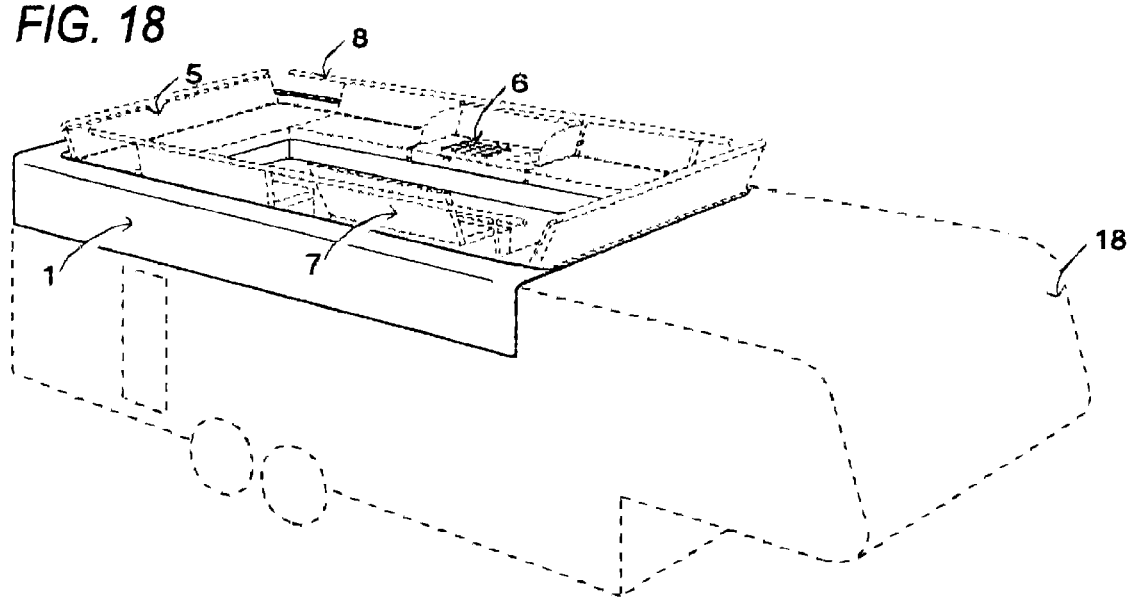
FIG. 18 is a perspective view of one embodiment of the invention depicting representative cowlings and rooftop furniture understructure as a one-piece assembly on a typical travel tailer rooftop (trailer shown in broken lines).

FIG. 18 perspective illustrates an embodiment of the invention one-piece cowling 1 assembled upon a typical trailer 18, showing fold upward seat backs 5, barbecue 6, hatchway lid (open position) 7, and safety handrails 8 from U.S. Pat. No. 6,237,988 (Messano) in the UP position (broken line).

While this present invention herein relates to my previous U.S. Pat. No. 6,237,988 (Messano)—(STREAMLINE ROOFTOP DECK FOR MOTORHOMES), this new invention has been described with respect to the preferred embodiments thereof, and it is to be understood that the invention is not limited to such precise forms of the apparatus, and that some or any combination of the elements may be used, and that changes may be made therein without departing from the scope of the invention defined in the appended claims.

What is claimed:

1. A vehicle rooftop deck system comprising a cowling enclosing the perimeter of a vehicle rooftop;

a plurality of rooftop safety handrails which fold down to a low profile for travel, which fold upward for use, which enclose the perimeter of the rooftop when in the upward position;

folding rooftop furniture backs of wich fold down to a low profile for travel and which backs fold upward for use.

2. The rooftop deck system of claim 1, wherein the cowling is one-piece.

3. The rooftop deck system of claim 1, wherein the cowling and furniture understructure are one-piece.

4. The rooftop deck system of claim 1, wherein the cowling, furniture understructure and a rooftop deck are one-piece.

5. The rooftop deck system of claim 4, wherein the one-piece cowling, furniture understructure and deck assembly form the roof of the vehicle.

6. The rooftop deck system of claim 1, wherein the cowling and a deck are one-piece.

7. The rooftop deck system of claim 1, wherein a number of sub-assemblies form a one-piece molded roof-deck structure.

8. The rooftop deck system of claim 1,wherein a number of sub-assemblies form a one-piece monocoque roof-deck structure.

9. The rooftop deck system of claim 1, wherein the system is also comprised of the vehicle roof with a hatchway through the roof to the interior of the vehicle.

10. The rooftop deck system of claim 1, wherein the vehicle is a motorhome.

11. The rooftop deck system system of claim 1, wherein the vehicle is a trailer.

12. The rooftop deck system system of claim 1, wherein the vehicle is amphibious.

13. The rooftop deck system of claim 1, wherein the furniture folding backs support the safety handrails.

14. The rooftop deck system system of claim 1, wherein the cowling encloses only a portion of the perimeter of a vehicle roof.

15. The rooftop deck system system of claim 1, wherein the safety handrails only enclose a portion of the perimeter of a vehicle roof.

* * * * *